Sept. 26, 1967 D. P. GREGG 3,344,237
DESPOSITED FILM TRANSDUCING APPARATUS
AND METHOD OF PRODUCING THE APPARATUS
Filed April 19, 1961 5 Sheets-Sheet 1

INVENTOR:
David Paul Gregg

Attorneys

Sept. 26, 1967 D. P. GREGG 3,344,237
DESPOSITED FILM TRANSDUCING APPARATUS
AND METHOD OF PRODUCING THE APPARATUS
Filed April 19, 1961 5 Sheets-Sheet 3

INVENTOR:
David Paul Gregg

Attorneys

United States Patent Office

3,344,237
Patented Sept. 26, 1967

3,344,237
DEPOSITED FILM TRANSDUCING APPARATUS AND METHOD OF PRODUCING THE APPARATUS
David Paul Gregg, Culver City, Calif., assignor to Minnesota Mining and Manufacturing Company, St. Paul, Minn., a corporation of Delaware
Filed Apr. 19, 1961, Ser. No. 104,071
16 Claims. (Cl. 179—100.2)

This invention relates to a magnetic head for providing a transducing action between the recording of magnetic information on magnetic medium such as a tape and the production of electrical signals. More particularly, the invention relates to a transducer head which is able to record signals on the magnetic medium with a considerably greater density and at a considerably higher frequency or shorter wave length than the heads now in use and which is able to reproduce such signals from the magnetic medium. The invention is especially concerned with heads produced by vacuum depositions and electroplating of different materials and with methods of producing such heads.

The use of magnetic heads to record and reproduce information has become quite important in recent years. For example, many digital computers use magnetic heads which are disposed in contiguous relationship to a movable medium such as a magnetic tape or a cylinder to provide a transducing action between the head and the medium. Magnetic heads are also used in conjunction with tapes to provide a recording and subsequent reproduction of video information such as for television programs.

Considerable effort has been devoted in recent years to perfect heads but such efforts have not proved satisfactory in certain important respects. For example, the frequency and wave length response of the heads now in use is relatively limited and is considerably below the frequency and wave length response which can be obtained from the electrical circuits associated with the heads. Furthermore, the heads are relatively bulky and require a considerable amount of space on the medium to record bits of information. This prevents the information from being packed on the medium, such as the tape, with as great a density as would otherwise be desired. Because of this, relatively great amounts of tape have had to be used.

This invention provides a transducer head which overcomes the above difficulties. The head is able to record and reproduce information at a frequency considerably greater than the maximum frequencies, and at wave lengths considerably shorter than the minimum wave lengths, capable of being attained by the heads now in use. In this way, the amount of tape required to store a particular number of bits of information is considerably less than the amount of tape presently required to store the same number of bits of information.

The head constituting this invention also has certain other important advantages. One of these advantages results from the provision of a magnetic circuit with only a single gap instead of with two gaps as in the heads now in use. This single gap is required since the head is disposed with the gap in contiguous relationship to the medium, such as the tape, to provide a linkage of magnetic flux between the medium and the head through the gap. Since only one gap is required and only one gap is provided in the head constituting this invention, the transducing action between the head and the medium, such as the tape, is facilitated. For example, the amplitude of the current required to flow through the winding in the head constituting this invention to obtain a recording of magnetic information on the tape is considerably reduced in comparison to the current required in the heads now in use.

Another advantage of the head constituting this invention results from the use of only two laminations to form the magnetic circuit. Furthermore, each of these laminations is formed from a thin film of magnetic material. The laminations are disposed in a direction transverse to the direction of movement of the medium such as the tape rather than in the direction of movement of the tape, as in the heads now in use. All of these factors are instrumental in improving the frequency and wave length response of the head, especially at relatively high frequencies and relatively short wave lengths. This results from a reduction in losses resulting from eddy currents and hysteresis effects. The use of only two laminations of small cross-sectional area is also instrumental in obtaining a high density of information on the medium such as the tape.

The magnetic head constituting this invention is formed by novel methods. For example, the magnetic loop and the windings are formed by the deposition, as by vacuum techniques or by electrodeposition, of molecules of suitable materials on an insulating member which serves as the backing for the head. By the use of such techniques, the laminations can be produced in the form of a thin film having precise tolerances at the air gap and having an infinitesimal thickness of uniform dimensions. The precise formation of the magnetic laminations is an important factor in obtaining optimum results from the head constituting this invention.

Figure 17:
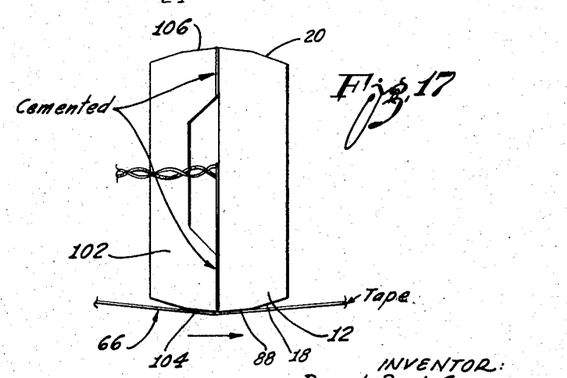
FIGURE 17 is a front elevational view of the head constituting this invention with the head ready for operation.

The head constituting this invention may be formed by a plurality of sequential steps which are illustrated in the drawings. These steps represent the formation of successive layers of material on a substrate 12 which serves as a backing member. The substrate 12 may be formed from a suitable insulating material such as sapphire or any other monocrystalline material and may be provided with a pair of parallel surfaces 14 and 16 separated from each other by a distance in the order of 0.125″. The surfaces 16 and 14 are joined by a pair of oblique surfaces 18 and 20 each of which is disposed at an angle of approximately 75° to the surfaces 16 and 14. The surface 18 is polished as by lapping to a glass smoothness before the formation of any layers of material on the substrate since at least a portion of this surface will be disposed in contiguous relationship to a medium such as a magnetic tape 66 (FIGURE 17).

Figure 1A:
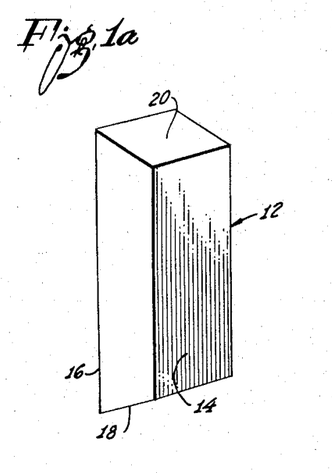
FIGURE 1a is a perspective view of a substrate on which various layers of material are deposited in the method constituting this invention to produce the head constituting this invention.
Figure 1B:
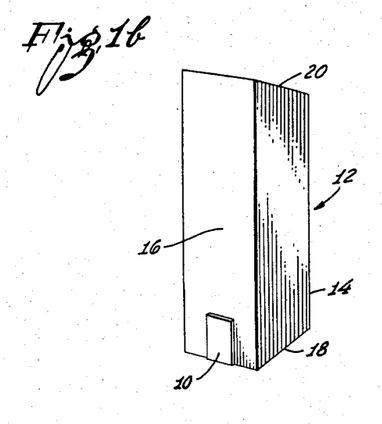
FIGURE 1b is a perspective view of a substrate with a layer of magnetic material deposited on the substrate in the first step of the method constituting this invention.
Figure 2:
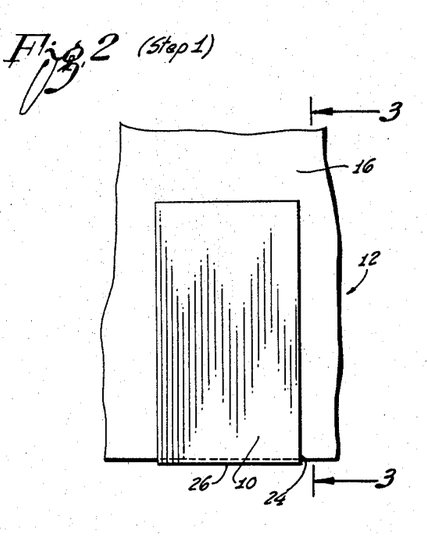
FIGURE 2 is an enlarged fragmentary front elevational view of the substrate shown in FIGURE 1b after the deposition of the magnetic layer.
Figure 3:
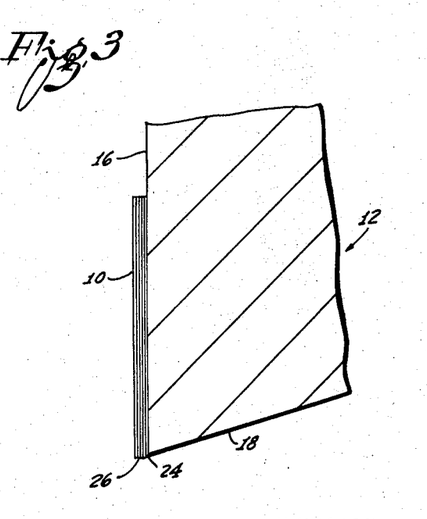
FIGURE 3 is an enlarged fragmentary sectional view substantially on the line 3—3 of FIGURE 2.

As a first step in the method constituting this invention, a layer 10 of a paramagnetic substance, such as iron or any other ferromagnetic material, is deposited on the substrate 12, as indicated in FIGURES 1b, 2 and 3. The layer 10 of iron may be deposited on the substrate 12 in a suitable thickness such as 0.0001″ and in a width of approximately 0.0680″ and a depth of approximately 0.1200″. The layer 10 of iron is deposited to overhang the knife edge 24 of the substrate 12, this overhang being indicated at 26 in FIGURES 2 and 3. The layer 10 constitutes a thin monocrystalline film, a monocrystalline arrangement being desirable to increase the permeability of the film. The thin film 10 may be produced by vacuum deposition or electrodeposition.

Figure 4:
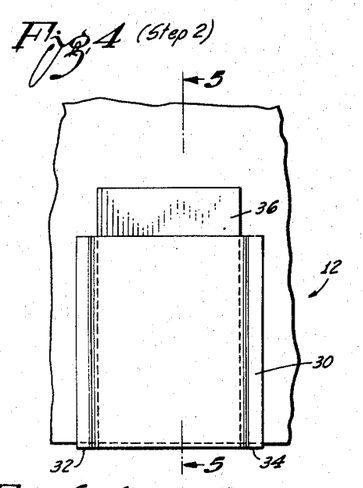
FIGURE 4 is an enlarged fragmentary front elevational view, similar to that shown in FIGURE 2, of the substrate after a layer of insulating material has been deposited on the substrate in a second step of the method constituting this invention.
Figure 5:
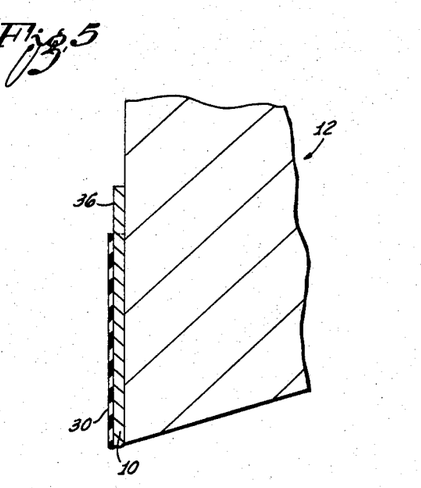
FIGURE 5 is an enlarged fragmentary sectional view substantially on the line 5—5 of FIGURE 4.
Figure 8:
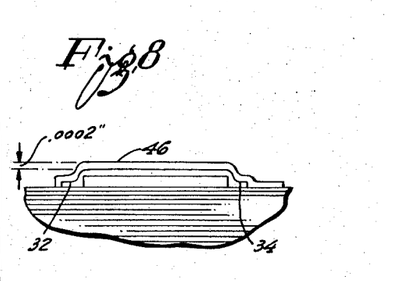
FIGURE 8 is an enlarged fragmentary sectional view substantially on the line 8—8 of FIGURE 6.

As a second step in the method forming a part of this invention, a layer 30 (FIGURES 4 and 5) of insulating material is deposited on the layer 10 of iron. The insulating material 30 is preferably hard and thermally stable, aluminum oxide being suitable for use. The insulating material 30 may be formed either by vacuum deposition or electrodeposition. The layer 30 of aluminum oxide may be deposited, in a thickness in the order of 0.0000035″ and may be provided with a lateral dimension in the order of 0.080″. In this way, the layer 30 of aluminum oxide tends to overlay the layer 10 of iron such that the layer 30 is disposed directly on the substrate 12 at the lateral extremities of the layer, as indicated at 32 and 34 in FIGURES 4 and 8. The depth of the layer 30 is less than the depth of the layer 10 of iron by a distance in the order of 0.030″ so that the layer 10 of iron remains exposed at the rear end of the layer, as indicated by 36 in FIGURES 4 and 5.

After the layer 30 of aluminum oxide has been deposited on the substrate 12 in the manner described in the previous paragraph, layers of a suitable conducting material, such as iridium, are deposited as by vacuum techniques. These layers include strips 40, 42, 44 and 46, each of which has a width in the order of 0.0100″ and each of which has a spacing relative to one another in the order of 0.0100″. The strips 40, 42, 44 and 46 are parallel to one another.

The conductive strip 46 is spaced from the knife edge 24 by a distance in the order of 0.0100″ and is connected through a lead 48 to a terminal pad 50 which is disposed on the substrate 12 in back of the rear portion 36 of the layer 10 of iron oxide. In like manner, the conductive strip 40 is integral with a lead 52, which in turn communicates with a terminal pad 54. The leads 48 and 52 are disposed at the lateral extremities of the layer 30 of aluminum oxide and may be provided with lateral dimensions in the order of 0.0100″. The terminal pads 50 and 54 may be provided with lateral dimensions in the order of 0.0390″ and with depths in the order of 0.1250″ and may be laterally separated from each other by a distance in the order of 0.010″.

The strips 40, 42, 44 and 46, the leads 48 and 52, and the terminal pads 50 and 54 are formed as by vacuum deposition or electrodeposition in a thickness in the order of 0.0002″. The strips 40, 42, 44 and 46, the leads 48 and 52, and the terminal pads 50 and 54 are preferably formed from a suitable material such as iridium. Iridium is advantageous since it will not melt when the head constituting this invention is annealed to improve the magnetic properties of the head. As will be seen, the lead 52 directly contacts the layer 10 in the exposed portion 36 to effectively form a ground terminal. One purpose of this ground terminal is to bleed static electricity to ground. The static electricity is produced as a result of the movement of the tape 66 past the head constituting this invention.

Figures 6, 7:
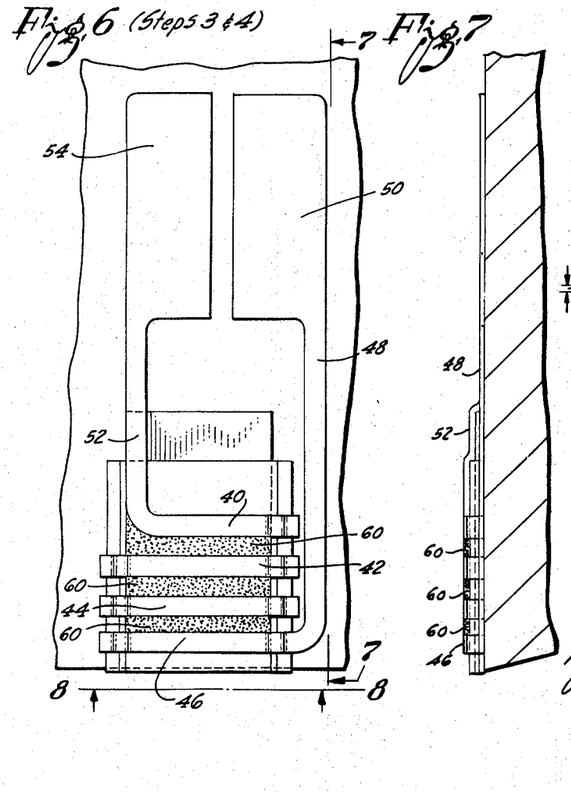
FIGURE 6 is an enlarged fragmentary front elevational view, similar to that shown in FIGURE 2, of the substrate after layers of conductive material and insulating material have been deposited on the substrate in third and fourth steps of the method constituting this invention, the insulating material being restricted to those areas between the segments of conducting material and surrounding the segments of conducting material.
FIGURE 7 is an enlarged fragmentary sectional view substantially on the line 7—7 of FIGURE 6.

The spaces between the strips 40, 42, 44 and 46 are filled with a suitable insulating material such as aluminum oxide although other suitable materials such as magnesium fluoride may also be used. These insulating layers are indicated at 60 in FIGURES 6 and 7 and are provided with properties to prevent any interaction with the layers of iron or iridium since such interaction would tend to contaminate the iridium and especially the iron. The layers 60 also have the properties of serving as a nonconductive baffle to prevent the iron from sinking through the different layers of material. Such a sinking of magnetic material would affect the magnetic properties of the head constituting this invention.

Figure 9:
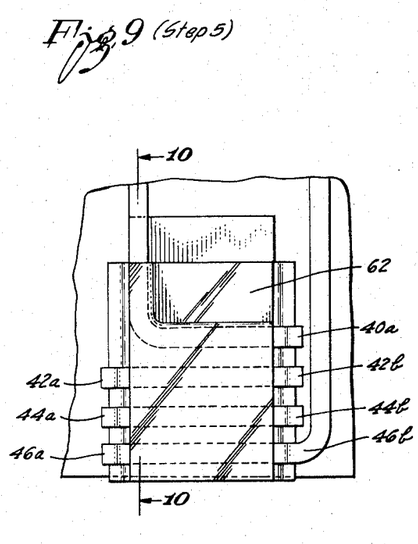
FIGURE 9 is an enlarged fragmentary front elevational view, similar to that shown in FIGURE 2, of the substrate after a further layer of insulating material has been deposited on the substrate in a fifth step of the method constituting this invention.
Figure 10:
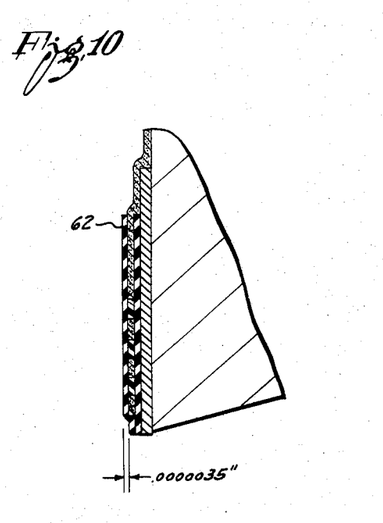
FIGURE 10 is a sectional view substantially on the line 10—10 of FIGURE 9.

In the next step, a thin layer 62 of aluminum oxide is disposed upon the strips 40, 42, 44 and 46 of iridium and the filling material 60 as shown in FIGURES 9 and 10. The layer 62 of aluminum oxide is preferably monocrystalline and may be formed as by vacuum deposition or electrodeposition. The layer 62 of aluminum oxide may be provided with a thickness in the order of 0.0000035″. The layer 62 of aluminum oxide is provided with lateral dimensions such that the lateral extremities of the conductive strips 40, 42, 44 and 46 are still exposed. This is indicated at 40a for the strip 40, 42a and 42b for the strip 42, 44a and 44b for the strip 44 and 46a and 46b for the strip 46 in FIGURES 9 and 10. The layer 62 of aluminum oxide is deposited directly on the layer 30 of aluminum oxide at the front portion adjacent to the knife edge 24. The successive layers 30 and 62 in the front region 64 constitute the single gap in the magnetic circuit or ring of the head forming a part of this invention. This gap is disposed in contiguous relationship to a medium such as a tape 66 (FIGURE 17) so as to provide a magnetic coupling between the magnetic flux in the tape and the magnetic flux in the head constituting this invention. As will be seen from the above discussion, the gap produced by the successive layers 30 and 62 of aluminum oxide in the front portion near the knife edge 24 may have a thickness of approximately 0.000007 inch.

Figure 11:
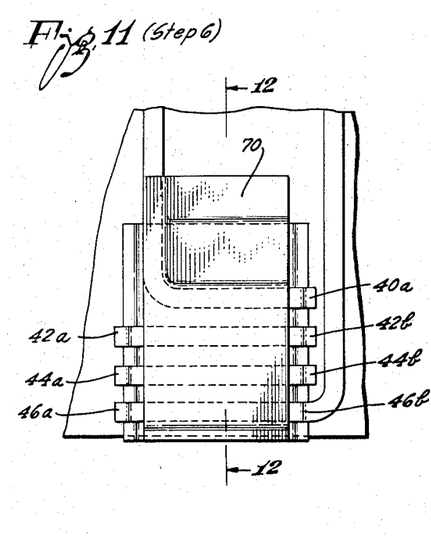
FIGURE 11 is an enlarged fragmentary front elevational view, similar to that shown in FIGURE 2, of the substrate after a second layer of magnetic material has been deposited on the substrate in a sixth step of the method constituting this invention.
Figure 12:
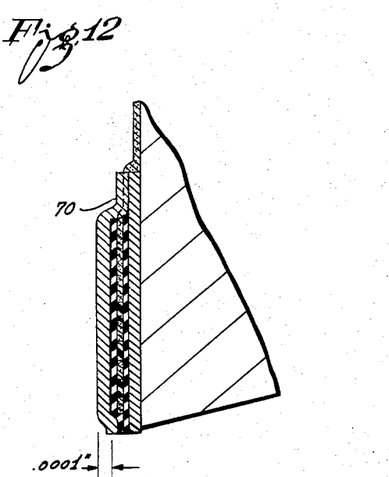
FIGURE 12 is a sectional view substantially on the line 12—12 of FIGURE 11.

A layer 70 of the paramagnetic material such as iron is subsequently deposited on the layers previously deposited. The layer 70 preferably constitutes a monocrystalline film formed as by vacuum deposition or electrodeposition. The layer 70 of iron may be deposited with a thickness in the order of 0.0001″. The lateral dimensions of the layer 70 are such that the lateral extremities 40a, 42a and 42b, 44a and 44b and 46 and 46b of the conductive strips 40, 42, 44 and 46 are still exposed but insulated from layer 70. The depth of the layer 70 of iron is such that the layer 70 rests directly on the layer 10 in the region 36 at the rear end of the layer 10. In this way, a magnetic circuit or ring having only a single gap is formed by the layers 10 and 70 of magnetic material. The single gap is defined by the successive layers 30 and 62 of aluminum oxide, as described in detail previously.

Upon the formation of the closed magnetic circuit, a layer 78 (FIGURES 13 and 14) of suitable insulating material such as aluminum oxide is disposed on the layer 70. The aluminum oxide may be provided with any suitable thickness. For example, the aluminum oxide may be provided with a thickness in the order of 0.0000035″. The lateral dimensions and disposition of the layer 78 of aluminum oxide are such that the lateral extremities 40a, 42a and 42b, 44a and 44b and 46a and 46b of the conductive strips 40, 42, 44 and 46 are still exposed. The depth of the layer 78 of aluminum oxide is sufficient to cover partially the layer 70 of iron deposited in the previous strip.

Figure 13:
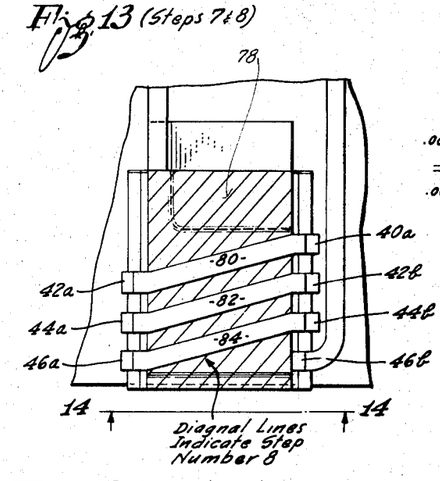
FIGURE 13 is an enlarged fragmentary front elevational view, similar to that shown in FIGURE 2, of the substrate after a third and final layer of insulating material and a second layer of conductive material have been deposited on the substrate in seventh and eighth steps of the method constituting this invention.
Figure 14:
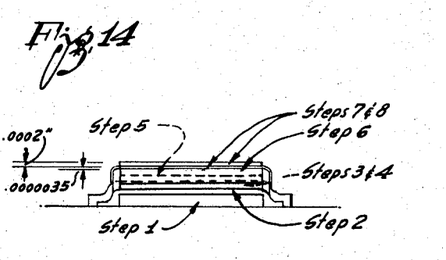
FIGURE 14 is an enlarged fragmentary sectional view substantially on the line 14—14 of FIGURE 13.

Strips 80, 82 and 84 of conductive material such as iridium are subsequently deposited on the layer 78. The extremities of the strips 80, 82 and 84 are respectively disposed directly above, so as to be integral with the extremities 40a and 42a, the extremities 42b and 44a, and the extremities 44b and 46a. The middle portions of the conductive strips 80, 82 and 84 are skewed. In this way, an electrical winding having approximately 3½ turns is formed although a winding with any suitable number of turns may also be formed in a similar manner. The winding is disposed around the lamination of magnetic material defined by the layer 70 so that a transducing action is provided between the flow of flux through the magnetic circuit or ring defined by the layers 10 and 70 of iron and the flow of current through the winding.

Figure 16:
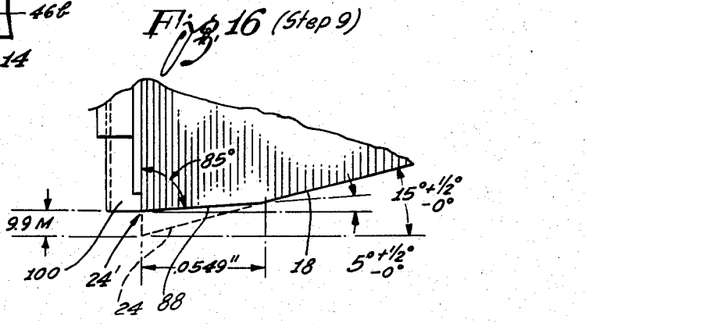
FIGURE 16 is an enlarged fragmentary sectional view substantially on the line 16—16 of FIGURE 15.

The substrate 12 is then polished along the surface 18 at the position adjacent to the knife edge 24 so as to form a surface 88. The surface 18 is polished to form the surface 88 so as to change the included angle at the knife edge 24 from a value of 75° to a value of 85° This may be best seen in FIGURE 16. This change in the angle of the knife edge 24 from a value of 75° to a value of 85° may occur along a distance in the order of 0.0549″, the new knife edge being illustrated at 24′ in FIGURE 16. Under such circumstances, the surface 16 becomes reduced at the new knife edge 24′ through a distance in the order of 0.0099″. In this way, the depth of the gap is reduced to a dimension in the order of 0.0001″, and the gap interfacial area is accordingly defined in the magnetic circuit or ring formed by the layers 10 and 70 of iron.

Figure 15:
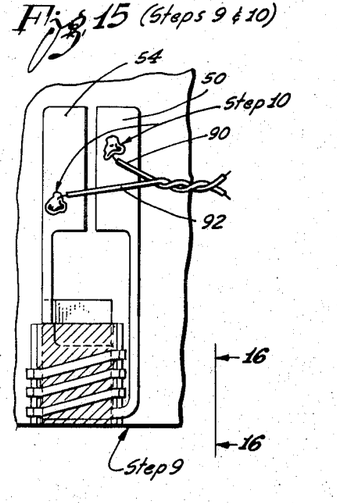
FIGURE 15 is an enlarged fragmentary front elevational view, similar to that shown in FIGURE 2, of the substrate after the ninth and tenth steps of the method constituting this invention have been performed.

A pair of external leads 90 and 92 are then respectively attached as by welding to the conductive terminal pads 50 and 54. This may be best seen in FIGURE 15. The external leads 90 and 92 may be intertwined to maintain the leads in a somewhat fixed position. As a final step, a substrate 102 is bonded as by a suitable cement to the substrate 12 along the surface 14 of the substrate 12. The substrate 102 may be made from the same material as the substrate 12, sapphire being a good example. The substrate 102 is provided with surfaces 104 and 106 constituting inverted copies of the surfaces 16 and 18 in the substrate 12. However, the substrate 102 is grooved as at 110 along an intermediate portion of the length of a surface to provide room for the external leads 90 and 102.

The magnetic head formed by the method described in detail above has certain important advantages. One of these advantages results from the fact that the magnetic circuit defined by the layers 10 and 70 of iron is in the form of a thin film. Because of the infinitesimal thickness of the laminations defined by the layers 10 and 70 of iron, losses resulting from hysteresis and eddy current effects are minimized. This causes the frequency range of the magnetic head constituting this invention to be considerably increased in comparison to the response of the heads now in use. For example, the head constituting this invention operates satisfactorily in the tens of megacycles per second.

The head constituting this invention is also advantageous in that the gap between the laminations defined by the layers 10 and 70 of iron is relatively small. As previously described, this gap is in the order of 0.000007 inch. Furthermore, the magnetic circuit is defined by only two laminations, each having a thickness in the order of 0.0001″. Because of these factors, the head constituting this invention is able to record information with a density considerably greater, or with a wave length considerably shorter, than that obtained by the heads now in use. This enhanced density of information packing on the medium such as the tape 66 considerably reduces the speed of tape which is required to record a given amount of information.

As will be seen from the above discussion and from the drawings, the two laminations defined by the layers 10 and 70 are disposed in a direction transverse to the direction of movement past the head of the medium such as the tape 66. This is in contrast to the disposition of the laminations in the heads now in use since the laminations in such heads are disposed in parallel relationship to the direction of movement of the medium such as the tape 66. By disposing the laminations in the head constituting this invention in a direction transverse to the direction of the movement of the tape 66, the high frequency response of the head is further magnified.

There are also other advantages to the head forming a part of this invention. This results from the precise tolerances with which the different layers of material can be formed. These precise tolerances cause successive heads made by the method forming a part of this invention to have similar characteristics which can be predicted in advance.

The head constituting this invention has certain other advantages not available in previous heads. For example, because of the somewhat infinitesimal thickness of the different layers of insulating material, distributed capacitive values are produced which are different from those obtained in the heads now in use. These capacitive values cooperate with the inductance in the head to control the resonant frequency in accordance with the formula $$f_r = \frac{1}{2\pi\sqrt{L_f C}}, \text{ where} \qquad (1)$$

$f_r$=the resonant frequency;
$L_f$=the inductance of the head at the resonant frequency; and
$C$=the cumulative value of the distributed capacitances in the head.

Figure 18:
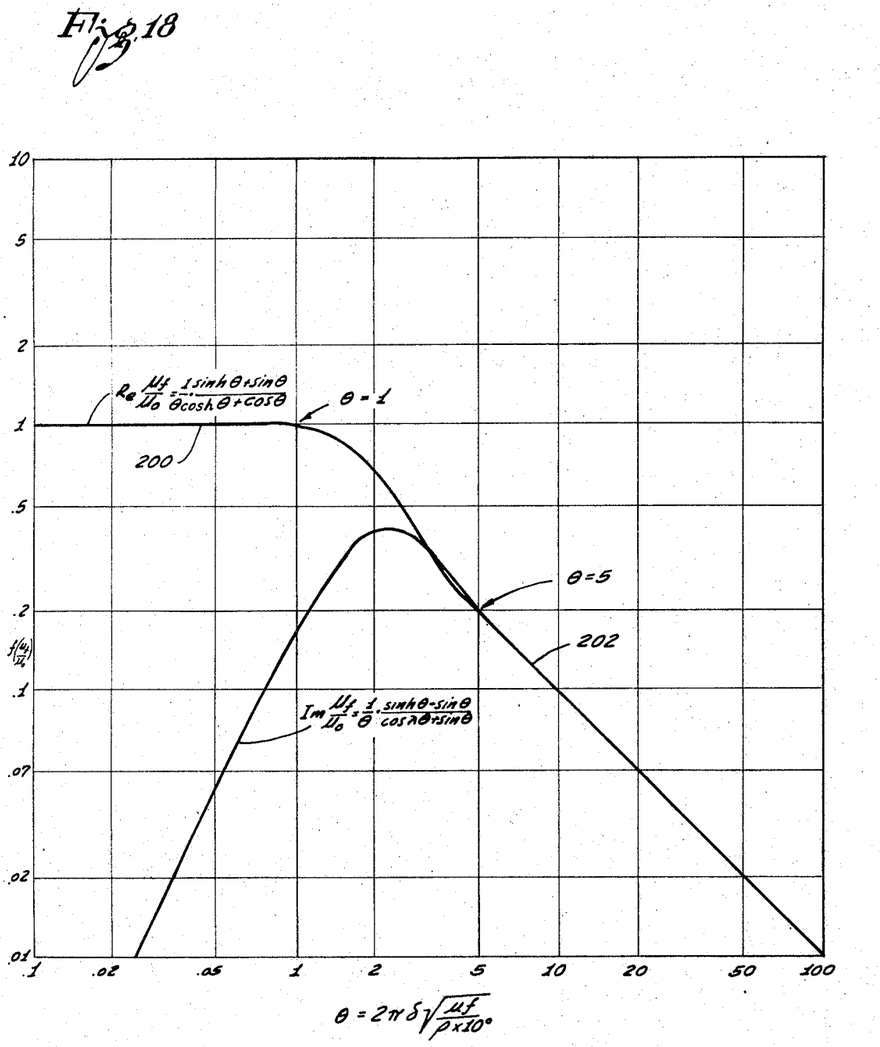
FIGURE 18 illustrates graphs showing different parameters in the operation of the transducer head constituting this invention at progressive frequencies.

As will be seen at 200 in FIGURE 18, the inductance $L_n$ of the head constituting this invention remains substantially constant until a frequency which causes $\phi$ to approach unity, all other factors remaining constant. The inductance then starts to decrease with increasing $\phi$, beyond that frequency at which $\phi$ has a value of 5, all other factors remaining constant. This is indicated at 202 in FIGURE 18. The relationship between $L_f$ and $L_o$ may be expressed as $$L_f = L_o \cdot \frac{1}{\theta}, \text{ where} \quad (2)$$

$$\theta = 2\pi\delta\sqrt{\frac{\mu_o \cdot f}{\rho \cdot 10^9}} \quad (3)$$

In Equation 3, $\delta$ = the thickness of each of the magnetic layers 10 and 70;
$\mu_o$ = the initial magnetic permeability of each of the magnetic layers 10 and 70 at the reduced frequencies;
$\rho$ = the resistivity of each of the magnetic layers 10 and 70; and
$f$ = the operating frequency.

By combining Equations 1 and 3, a relationship is obtained as follows:

$$f_r \left( \frac{\delta\sqrt{\frac{\mu_o}{\rho \cdot 10^9}}}{2\pi L_o C} \right)^{2/3} \quad (4)$$

Because of the parameters of the different layers, the value of $\theta$ of the head constituting this invention is greater than 5 at a frequency approximating the resonant frequency by the control of the distributed capacitance C. This is in turn set by the insulating layer thicknesses and the area of the conducting layer thicknesses. Furthermore, the parameters of the different layers cause the resonant frequency $f_r$ to occur above any frequencies at which the head may be used from a practical standpoint. This is desirable since the operation of a head at the resonant frequency or at frequencies approaching the resonant frequency causes a considerable amount of distortion and noise to be produced in the signals from the head.

By providing the value of $\theta$ less than 1 as set forth above, variations in inductance are minimized in the relationship $$R_e \frac{\mu_f}{\mu_o} = \frac{1}{\theta} \cdot \frac{\sinh \theta + \sin \theta}{\cosh \theta + \cos \theta} \quad (5)$$

In Equation 5, $$R_e \frac{\mu_f}{\mu_o}$$

is the real value of the ratio of the complex permeability at any operating frequency $f$ with respect to the initial permeability of the magnetic material. By providing the different layers with the proper thickness, the relationship $$R_e \frac{\mu_f}{\mu_o}$$

is such that the magnetic reluctance and inductance of the head do not suffer at the highest operating frequency. This may be seen from FIGURE 18, which indicates that the value $$R_e \frac{\mu_f}{\mu_o}$$

is substantially constant through a range of values until a value where $\theta$ is greater than 1. The term "complex permeability" is defined in an article written by K. A. MacFadyen and entitled, "Vector Permeability," in the British publication of the Journal Institution of Electrical Engineers, volume 94, article 3, No. 32 in November 1947.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In a transducer head for providing a transducing action with a magnetic medium movable past the head, an insulating member, a first lamination having magnetic properties and disposed on the insulating member in the form of a thin film over an extended area of the insulating member, a thin insulator disposed on the first lamination over an area extending from a first edge of the first lamination to a position approaching but not reaching a second edge of the lamination opposite to the first edge, and a second lamination having magnetic properties and disposed in the form of a thin film on the thin insulator and on the first lamination at the positions approaching the second edge of the first lamination to form a magnetic circuit at the second edge and to define a gap at the first edge, the first and second laminations being stacked relative to each other in a direction corresponding to the direction of movement of the medium.

2. A transducer head for providing a transducing action with a magnetic medium movable past the head, including, a pair of laminations each formed from a magnetic material and each deposited in a thin film in insulated relationship to the other lamination along a major portion of the length of the lamination but integral with the other lamination at a first end and each stacked relative to the other in a direction corresponding to the direction of movement of the medium to define a magnetic circuit having a gap at a second end opposite to the first end whereby a flux linkage is capable of being produced between the magnetic medium and the magnetic circuit through the gap, a winding disposed in magnetically coupled relationship to the magnetic circuit to produce a transducing action between the flux in the magnetic circuit and the current in the winding, and insulating means disposed between the laminations and the winding, the winding contacting the magnetic laminations at one position to provide a common ground between the winding and the magnetic circuit.

3. A method of forming a transducer head to provide a transducing action with a magnetic medium movable past the head, including the steps of: depositing molecules of a magnetic material on an insulating member to form a first thin film of the magnetic material on the insulating member, providing a first thin layer of an insulating material on the first thin film, depositing molecules of an electrically conductive material on the first layer of insulating material to form a first thin film of the conductive material, depositing a filling layer of insulating material between those areas of the conductive material which lie on the first thin film of the magnetic material, depositing a second thin layer of the insulating material on the first thin film of the conductive material and on the filling layer of the insulating material, depositing molecules of the magnetic material on the second thin layer of the insulating material to form a second thin film of the magnetic material in integral relationship with the first thin film of the magnetic material for the production of a magnetic circuit open at one end whereby the magnetic loop is disposed with the open end in contiguous relationship to the magnetic medium for providing a linkage of flux between the magnetic medium and the magnetic circuit, depositing a third thin layer of the insulating material on the second thin film of the magnetic material, and depositing molecules of the electrically conductive material on the third layer of the insulating material to form a second thin film of the conductive material in integral relationship with the first thin film of the conductive material at the ends of the film for the production of a winding in inductively coupled relationship to the magnetic circuit whereby a transducing action is produced between the occurrence of magnetic flux in the magnetic circuit and the flow of current through the winding.

4. A method of forming a transducer head to provide a transducing action with a magnetic medium movable past the head, including the steps of: depositing a first thin film of magnetic material on an insulating member in a direction transverse to the direction of movement of the medium, disposing an insulating layer on at least a portion of the thin film from an area extending from a first edge of the thin film and the insulating member to a position approaching but not reaching a second edge of the film opposite to the first edge, and depositing a second thin film of the magnetic material on the thin film and on the insulating layer in the transverse direction to form an integral surface with the first thin film at the exposed portion of the thin film near the second edge of the film for the formation of a magnetic circuit having a gap at the first edge of the thin films.

5. A method of forming a transducer head to provide a transducing action with a magnetic medium movable past the head, including the steps of: forming a first magnetic lamination on an insulating member, forming one half of each turn of a winding on the first magnetic lamination and in insulated relationship to the first magnetic lamination along at least a portion of the first magnetic lamination, forming a second magnetic lamination on the insulating member and in insulated relationship both to the first magnetic lamination and the first one half of each turn of said winding, and forming the second half of each turn of the winding on the second magnetic lamination and in insulated relationship to the second magnetic lamination.

6. The combination set forth in claim 5 in which the second magnetic lamination is formed in contacting relationship with the first magnetic lamination along a portion of the area of the first magnetic lamination and in which the second halves of the turns of the winding are formed with the ends in contacting relationship with the ends of the first halves of the turns of the winding.

7. The method set forth in claim 6 wherein the first and second magnetic laminations and the first and second halves of each turn of the winding are formed in a direction transverse to the direction of movement of the medium.

8. A method of forming a transducer head to provide a transducing action with a magnetic medium movable past the head, including the steps of: forming a first magnetic lamination on an insulating member, forming a first insulating layer on the first magnetic lamination along a first particular area of the lamination to maintain a second particular area of the lamination exposed, forming a first half of each turn of an electrical winding on the first insulating layer in insulated relationship to the first magnetic lamination, forming a second insulating layer over the first half of each turn of the winding with the ends of each half turn of the winding exposed and with the second particular area of the first magnetic lamination exposed, forming a second magnetic lamination on the second insulating layer and on the second particular area of the first magnetic lamination with the ends of the first half turns of the winding exposed, forming a third insulating layer on the second magnetic lamination with the ends of each half turn of the winding exposed, and forming the second half of each turn of the winding on the third insulating layer with the ends of the second half turns of the winding on the exposed ends of the first half turns of the winding.

9. The method set forth in claim 8 in which the first half of the electrical winding is formed directly on the exposed portion of the first magnetic lamination to provide a common ground for the magnetic circuit and the winding.

10. The method set forth in claim 8 wherein the first and second laminations and the first, second and third insulating layers and the first and second halves of each turn of the winding are formed in a direction transverse to the direction of movement of the medium.

11. In a transducer head for providing a transducing action with a magnetic medium movable past the head, including, a pair of laminations made from a magnetic material and each constituting a thin film, the pair of laminations being disposed in a stacked relationship in a direction corresponding to the direction of movement of the medium and being formed to define a magnetic circuit with only a single air gap whereby the magnetic circuit may be disposed with the air gap in magnetically coupled relationship to the magnetic medium, and insulating means disposed between the pair of laminations to separate the laminations for the formation of the magnetic circuit, each of the magnetic laminations having a thickness $\delta$, a resistivity $\rho$ and an initial permeability $\mu_o$ and in which these parameters can be defined by the relationship $$\theta = 2\pi\delta\sqrt{\frac{\mu_o f}{\rho \cdot 10^9}} \text{ where}$$

$f$ is the operating frequency and where the quantity $\theta$ is included in the relationship $$R_e \frac{\mu_f}{\mu_o} = \frac{1}{\theta} \cdot \frac{\sinh\theta + \sin\theta}{\cosh\theta + \cos\theta} \text{ and}$$

where $$R_e \frac{\mu_f}{\mu_o}$$

is substantially constant over the operating range of frequencies $f$ of the head and involving a value less than 1 for $\theta$.

12. A method of forming a transducer head to provide a transducing action with a magnetic medium movable past the head, including the steps of: depositing a first thin layer of magnetic material on a substrate where the first magnetic layer has an initial permeability of $\mu_o$, a thickness $\delta$ and a resistivity $\rho$, depositing a thin layer of insulating material on a portion of the first thin layer of magnetic material, and depositing a second thin layer of magnetic material on the first thin layer of the magnetic material and on the layer of insulating material to form a magnetic circuit with the first magnetic layer where the second magnetic layer has an initial permeability of $\mu_o$, a thickness $\delta$ and a resistivity $\rho$ and where these quantities can be expressed in the relationship $$\theta = 2\pi\delta\sqrt{\frac{\mu_o f}{\rho \cdot 10^9}} \text{ and}$$

where the quantity $\theta$ is involved in the relationship $$R_e = \frac{\mu_f}{\mu_o} = \frac{1}{\theta} \cdot \frac{\sinh\theta + \sin\theta}{\cosh\theta + \cos\theta} \text{ and}$$

where the quantity $$R_e \frac{\mu_f}{\mu_o}$$

remains substantially constant over the operating range of frequencies $f$ and over a range involving a value of $\theta$ less than 1.

13. A method of forming a transducing head to provide a transducing action with a magnetic medium movable past the head, including the steps of: depositing a first thin layer of a magnetic material on a substrate, depositing a first thin layer of an insulating material on a portion of the substrate, depositing first thin layers of an electrically conductive material on the first thin layer of insulating material, depositing a second thin layer of insulating material on the first thin layer of electrically conductive material, depositing a second thin layer of a magnetic material on the second thin layer of insulating material and on a portion of the first thin layer of magnetic material to form a closed magnetic circuit, depositing a third thin layer of insulating material on the second thin layer of magnetic material, and depositing a second thin layer of electrically conductive material on the third thin layer of insulating material and on the first thin layer of electrically conductive material to form an electrical winding with the first thin layer of electrically conductive material.

14. The method set forth in claim 19 in which the electrical winding formed by the first and second layers of electrically conductive materials has an inductance $L_f$ at a resonant frequency $f_r$ and in which the distributed capacitances between the different layers in the head is C and in which the resonant frequency is defined as $$f_r = \frac{1}{2\pi\sqrt{L_f C}}$$

and in which a quantity $\theta$ is defined as $$\theta = 2\pi\delta\sqrt{\frac{\mu_0 \cdot f}{\rho \cdot 10^9}}, \text{ where}$$

$\delta$ is the thickness of each of the first and second layers of magnetic material and where $\mu_0$ is the initial magnetic permeability of each of the first and second layers of magnetic material and where $\rho$ is the resistivity of the laminations and where the resonant frequency $f_r$ occurs at a value of $\theta$ having a value of at least 5 and in which the inductance $L_f$ at the resonant frequency $f_r$ is defined as $$L_f = \frac{L_0}{\theta} \text{ where}$$

$L_0$ is the inductance of each of the first and second layers of magnetic material at frequencies below that frequency at which $\theta$ is equal to one, all of the other factors remaining constant.

15. A transducer head for providing a transducing action with a magnetic medium movable past the head, including, a substrate of insulating material, a first thin layer of a magnetic material on the substrate in a direction transverse to the direction of movement of the medium, a first thin layer of an electrically insulating material on a portion of the substrate, first thin layers of an electrically conductive material on the first thin layer of the electrically insulating material, a second thin layer of the insulating material on the first thin layers of the electrically conductive material, a second thin layer of the magnetic material on the second thin layer of the insulating material in the transverse direction, the second thin layer of the magnetic material being in integral relationship with the first thin layer of the magnetic material at the exposed portion of the first magnetic layer to provide a closed magnetic circuit with only a single air gap and with the single air gap being disposed in magnetic proximity to the movable medium, a third thin layer of the insulating material on the second layer of the magnetic material, and second thin layers of an electrically conductive material on the third thin layer of the insulating material, the second thin layers of the electrically conductive material being in integral relationship with the first thin layers of the electrically conductive material to form an electrical winding, the different layers of the insulating, magnetic and electrically conductive materials being formed to produce a distributed capacitance C in the head and an inductance $L_0$ at frequencies considerably below that at which $\theta$ is equal to one and a resistivity $\rho$ for each of the first and second layers of magnetic material and an initial magnetic permeability $\mu_0$ for each of the first and second layers of magnetic material and a thickness $\delta$ for each of the first and second layers of magnetic material and an inductance $L_f$ at the resonant frequency $f_r$ where the resonant frequency $f_r$ is defined as $$f_r = \frac{1}{2\pi\sqrt{L_f C}}$$

and where the relationship between $L_f$ and $L_0$ is defined as $$L_f = \frac{L_0}{\theta}$$

and where the quantity $\theta$ is defined as $$\theta = 2\pi\delta\sqrt{\frac{\mu_0 \cdot f}{\rho \cdot 10^9}} \text{ and}$$

where the resonant frequency $f_r$ occurs at a value of $\theta$ of at least 5.

16. A method of forming a transducer head to provide a transducing action with a magnetic medium movable past the head, including the steps of: depositing molecules of a magnetic material on an insulating member to form first and second laminations in a magnetic circuit with an open end at one end of the magnetic circuit for disposition in contiguous relationship to the magnetic medium, depositing molecules of an electrically conductive material on the insulating material to form a winding material in inductively coupled relationship to the magnetic circuits to obtain a transducing action between the occurrence of flux in the magnetic circuit and the flow of current through the winding, and providing insulating layers to provide the magnetic circuit and the winding and to maintain the winding and the magnetic circuit in insulated relationship, the molecules of the electrically conducting material being deposited on the magnetic material in direct contact with the magnetic material at one position to form a common ground.

References Cited

UNITED STATES PATENTS

| | | | |
|---|---|---|---|
| 2,536,272 | 1/1951 | Friend | 170—100.2 |
| 2,666,187 | 1/1954 | Ketcham | 29—155.58 X |
| 2,668,878 | 2/1954 | Munroe | 179—100.2 |
| 2,673,896 | 3/1954 | Rettinger | 179—100.2 |
| 2,677,019 | 4/1954 | Buhrendorf | 179—100.2 |
| 3,120,001 | 1/1964 | Supernowicz | 179—100.2 X |

FOREIGN PATENTS 771,701  4/1957  Great Britain.

OTHER REFERENCES

"Magnetic Head has Megacycle Range" (Kornei), Electronics, November 1956, pp. 172–174.

BERNARD KONICK, *Primary Examiner.*

J. R. GOUDEAU, *Assistant Examiner.*